Patented Dec. 9, 1930

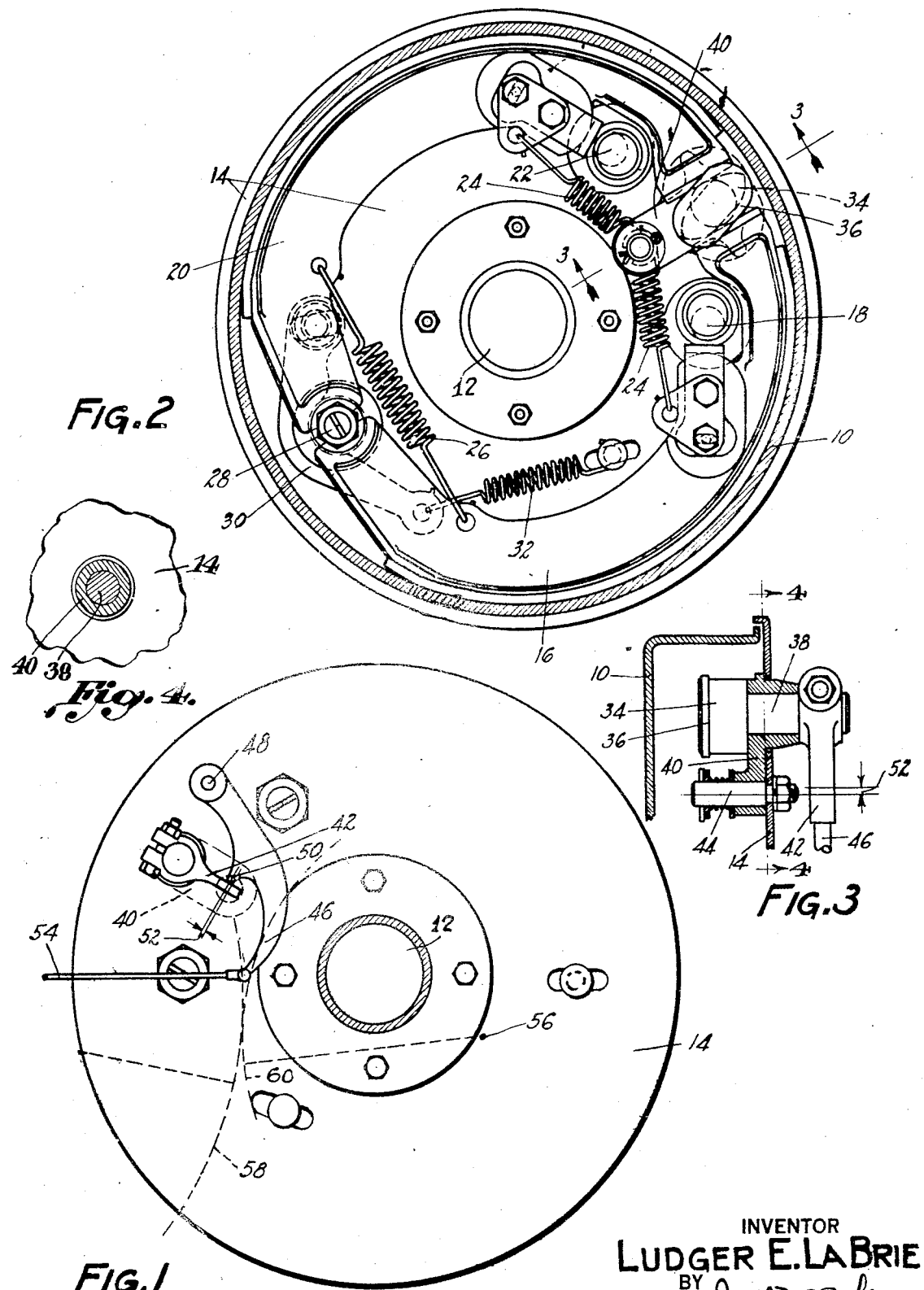

1,784,295

UNITED STATES PATENT OFFICE

LUDGER ELIZÉ LE BRIE, OF SOUTH BEND, INDIANA, ASSIGNOR TO BENDIX BRAKE COMPANY, OF CHICAGO, ILLINOIS, A CORPORATION OF ILLINOIS

BRAKE-OPERATING MEANS

Application filed May 6, 1926, Serial No. 107,151. Renewed June 11, 1928.

This invention relates to brakes, and is illustrated as embodied in an internal expanding brake for a rear automobile wheel. An object of the invention is to provide a novel operating means including a lever so arranged as to be in the best position for operation by the brake-applying connections, and which engages an arm forming part of a brake-applying device, the engagement of the lever and arm being such as to give the most efficient operation of the brake.

One important feature of novelty relates to fulcruming the lever, preferably at its end, on the backing plate or other support, for movement about an axis parallel to but spaced from the axis of a shaft rocked by the above-described arm. I prefer to operate the lever by a tension member connected to its free end, the engagement with the arm being shown as made through a projection of the like between the ends of the lever.

In one very desirable arrangement, the shaft is journalled in a bracket which is permitted to move to balance the brake-applying thrusts, for example by pivoting the bracket for movement about an axis passing through or near the point of engagement between the lever and arm. While this arrangement is advantageous also with brakes of other types, it is especially useful in applying a brake of the "duo-servo" type, in which the friction device anchors at one end when the drum is turning in one direction and at the other end when the drum is turning in the other direction. When used with a brake of this type, I prefer to thrust with the lever against the arm just above the pivotal axis of the bracket, or in some equivalent manner such that the thrust of rocking the shaft will also serve to shift the bracket in such a direction that when the vehicle is moving forward the anchored shoe does not leave its anchor at all.

The above and other objects and features of the invention, including various novel combinations of parts and desirable particular constructions, will be apparent from the following description of one illustrative embodiment shown in the accompanying drawing, in which:

Figure 1 is a vertical section through the rear axle, looking outwardly toward the backing plate of the brake;

Figure 2 is a radial section through the brake, just inside the head of the drum, and showing the shoes in side elevation;

Figure 3 is a partial section on the line 3—3 of Figure 2, showing one mounting for the movable bracket; and Figure 4 is a partial section on the line 4—4 of Figure 3, showing the shiftable arrangement of the camshaft bracket.

In the arrangement selected for illustration, the brake includes a drum 10 rotating with a wheel (not shown) which supports one end of a rear axle 12. The open side of the drum is closed by a suitable support such as a backing plate 14. The friction means of the brake is arranged between the drum and backing plate, and preferably includes a friction device anchoring at one end when drum 10 is turning in one direction and at the other end when the drum is turning in the opposite direction.

The particular friction device shown includes a shoe 16, anchoring against an eccentric adjustable pin 18 when the drum is turning counter-clockwise, and a shoe 20 anchoring against an eccentric adjustable pin 22 when the drum is turning clockwise. The shoes, when not applied, are held by a return spring 24 against pins 18 and 22 as positioning stops, and are pivotally connected with each other by being held by a spring 26 against a pivot connection 28. The shoes are centered when the brake is released, by a wedge lever 30 operated by a spring 32 and engaging pin 28 or a roller on the end of the pin.

The brake is applied by a device illustrated as including a cam 34 (shown with an end flange 36 confining the shoe ends laterally), the cam being operated by rocking a shaft 38 journalled in a novel bracket 40 and having at its end an arm 42. In this particular embodiment of the invention, bracket 40 is pivoted on a pin 44 opposite the end of arm 42.

According to an important feature of the invention, arm 42 is operated by a novel lever 46, shown fulcrumed at one end on a pin 48 carried by the backing plate 14 and arranged for movement about an axis parallel to but spaced from the shaft 38. This lever 46 may have a rounded thrust projection 50 engaging the end of arm 42. Preferably the line of thrust is a short distance 52 above the axis of pivot 44, so that the thrust of lever 46 turns bracket 40 as cam 34 expands the brake, so that the cam thrusts shoe 16 away from pin 18 against the drum, and shoe 20 does not leave its pin 22 at all unless the drum is turning counter-clockwise in Figure 2,— i. e. unless the vehicle is moving backward. Lever 46 may be operated by a tension element 54 connected to its free end.

In the arrangement illustrated, the axle tends to twist, when the brake is applied about an axis 56, which is the axis of what is known as "axle roll", the exact position of the axis depending on the arrangement of the vehicle springs. The arc 58 about which the end of lever 46 moves on a radius about the front end of element 54, is (for the short movement due to this "axle roll" or twisting) substantially coincident with arc 60 about the axis 56, so that the axle roll has no substantial effect on the brake.

While one illustrative embodiment has been described in detail, it is not my intention to limit the scope of the invention to that particular embodiment, or otherwise than by the terms of the appended claims. Except for the novel subject-matter hereinafter claimed, the above-identified brake may be, and is shown as being, substantially as fully described in my prior Patent No. 1,634,368, granted July 5, 1927.

I claim:

1. A brake comprising, in combination, friction means and an adjacent support, an applying device for the friction means having an operating arm, a bracket carrying the applying device and pivoted on the support, a lever pivoted at one end on the support and having a part between its ends engaging said arm and moving substantially in an arc intersecting the axis about which the bracket pivots, and a tension member connected to the free end of said lever.

2. A brake comprising, in combination, friction means and an adjacent support, an applying device for the friction means having an operating arm, a bracket carrying the applying device and mounted on the support, a lever pivoted at one end on the support and having a part between its ends engaging said arm, and a tension member connected to the free end of said lever.

3. A brake comprising, in combination, friction means and an adjacent support, an applying device for the friction means including a shaft extending through the support, an operating arm on the shaft on the opposite side from the friction means, and a lever fulcrumed at one end on the support at a point spaced from said shaft and having a part operatively engaging said arm.

4. A brake comprising, in combination, friction means and an adjacent support, an applying device for the friction means including a shaft extending through the support, an operating arm on the shaft on the opposite side from the friction means, and a lever fulcrumed at one end on the support and having a part between its ends operatively engaging said arm and arranged to be operated by engagement with its free end.

5. A brake comprising, in combination, friction means and an adjacent support, an applying device engaging the friction means and having a shaft extending through the support, an arm on the end of the shaft and on the opposite side of the support from the friction means, a bracket in which the shaft is journalled and which is arranged on the same side of the support as the friction means, and which is pivoted on the support opposite the end of said arm, and a lever pivoted on the support on the side opposite the friction means and operatively engaging the end of said arm.

6. A brake comprising, in combination, friction means and an adjacent support, an applying device engaging the friction means and having a shaft extending through the support, an arm on the end of the shaft and on the opposite side of the support from the friction means, a movable bracket in which the shaft is journalled and which is arranged on the same side of the support as the friction means, and a lever pivoted on the support on the side opposite the friction means and operatively engaging the end of said arm.

7. A brake comprising, in combination, an applying device having a shaft, an arm on the shaft, and a lever fulcrumed at one end for movement about an axis parallel to but spaced from the axis of the shaft and having between its ends a projection operatively engaging the end of said arm.

8. A brake comprising, in combination, an applying device having a shaft, a pivoted support in which the shaft is journalled, an arm on the shaft terminating adjacent the pivotal axis of the support, and a lever movable about an axis parallel to but spaced from the shaft and operatively engaging the arm a short distance from the pivotal axis of the support to swing the support about said axis as it rocks the shaft to apply the brake.

9. A brake comprising, in combination, a drum, a friction device anchoring at one end when the drum is turning in one direction and at the other end when the drum is turning in the other direction, an expanding device for the friction device having a short operating shaft, a movable bracket in which said shaft is journalled, an arm on the end of the shaft, a lever fulcrumed at one end and engaging the end of said arm between its ends, and a tension operating member connected to the free end of the lever, the lever being arranged to shift the bracket as it rocks the shaft to apply the brake.

10. A brake comprising, in combination, a drum, a friction device anchoring at one end when the drum is turning in one direction and at the other end when the drum is turning in the other direction, an expanding device for the friction device having a short operating shaft, a pivoted bracket in which said shaft is journalled, an arm on the end of the shaft and terminating at the pivotal axis of the bracket, a lever fulcrumed at one end and engaging the end of said arm between its ends and a short distance above said pivotal axis, and a tension operating member connected to the free end of the lever, the lever being arranged to shift the bracket as it rocks the shaft to apply the brake.

11. A brake comprising, in combination, a drum, a friction device anchoring at one end when the drum is turning in one direction and at the other end when the drum is turning in the other direction, an expanding device for the friction device having a short operating shaft, a movable bracket in which said shaft is journalled, an arm on the end of the shaft, a lever fulcrumed at one end and engaging the end of said arm between its ends, and a tension operating member connected to the free end of the lever, the bracket being shiftable to allow the friction device to anchor at either end.

In testimony whereof, I have hereunto signed my name.

LUDGER ELIZÉ LA BRIE.